United States Patent [19] [11] 4,373,550
Yelich [45] Feb. 15, 1983

[54] VALVE HAVING A BIAS-MOUNTED ELASTOMERIC SEALING ELEMENT, AND METHOD OF CONSTRUCTING THE SAME

[75] Inventor: William Yelich, Costa Mesa, Calif.

[73] Assignee: Cla-Val Co., Newport Beach, Calif.

[21] Appl. No.: 172,563

[22] Filed: Jul. 28, 1980

[51] Int. Cl.³ ............................................. F16K 15/00
[52] U.S. Cl. ........................ 137/516.29; 137/516.27; 251/364
[58] Field of Search ................ 137/516.27, 516.29, 137/543.21, 540, 533.17, DIG. 3; 251/360, 364, 366, DIG. 1

[56] References Cited

U.S. PATENT DOCUMENTS

| 144,844 | 11/1873 | Gould et al. | 137/DIG. 3 |
|---|---|---|---|
| 344,620 | 6/1886 | Blount . | |
| 631,036 | 8/1899 | Crump . | |
| 675,622 | 6/1901 | Clinton . | |
| 1,483,436 | 2/1924 | Hazard | 137/533.17 |
| 1,657,741 | 1/1928 | Carrey . | |
| 1,948,628 | 2/1934 | Penick et al. | 137/DIG. 3 |
| 1,968,200 | 7/1934 | Greve | 137/DIG. 3 |
| 2,116,408 | 5/1938 | O'Leary, Jr. et al. | 166/1 |
| 2,585,773 | 2/1952 | Hartman | 137/543.21 |
| 2,646,071 | 7/1953 | Wagner | 137/528 |
| 2,684,080 | 7/1954 | Crowell | 137/515.5 |
| 2,969,951 | 1/1961 | Walton | 251/332 |
| 2,981,282 | 4/1961 | Mack | 137/516.29 |
| 2,982,515 | 5/1961 | Rule | 251/332 |
| 3,058,486 | 10/1962 | McDermott et al. | 137/515.5 |
| 3,076,417 | 2/1963 | Rhodes et al. | 103/230 |
| 3,335,750 | 8/1967 | Kepner | 137/515.5 |
| 3,710,821 | 1/1973 | Turetsky | 137/527.8 |
| 4,005,710 | 2/1977 | Zeddies | 128/214 |

FOREIGN PATENT DOCUMENTS 1947093 3/1970 Fed. Rep. of Germany ...................... 137/543.21

Primary Examiner—Alan Cohan
Assistant Examiner—John A. Rivell
Attorney, Agent, or Firm—Gausewitz, Carr, Rothenberg & Edwards

[57] ABSTRACT

A radially inner portion of a flat annular elastomeric washer is inserted and retained in a frustoconical annular groove formed in a cylindrical valve seat of an inline disc check valve. The groove is positioned and dimensioned so that it grips the washer and holds it in a radially stretched, axially skewed configuration wherein one of the washer's outer peripheral corner edges forms a leading sealing edge of the valve seat. At low back pressures in the valve, a line seal is formed between the leading washer edge and the valve's closure disc. High back pressures cause the disc to rearwardly deflect the protruding radially outer portion of the washer and engage the valve seat itself. Because the installed washer is both radially stretched and axially skewed, forward flow through the valve does not tend to dislodge the washer, and reverse flow around the washer portion within the groove is prevented.

12 Claims, 11 Drawing Figures

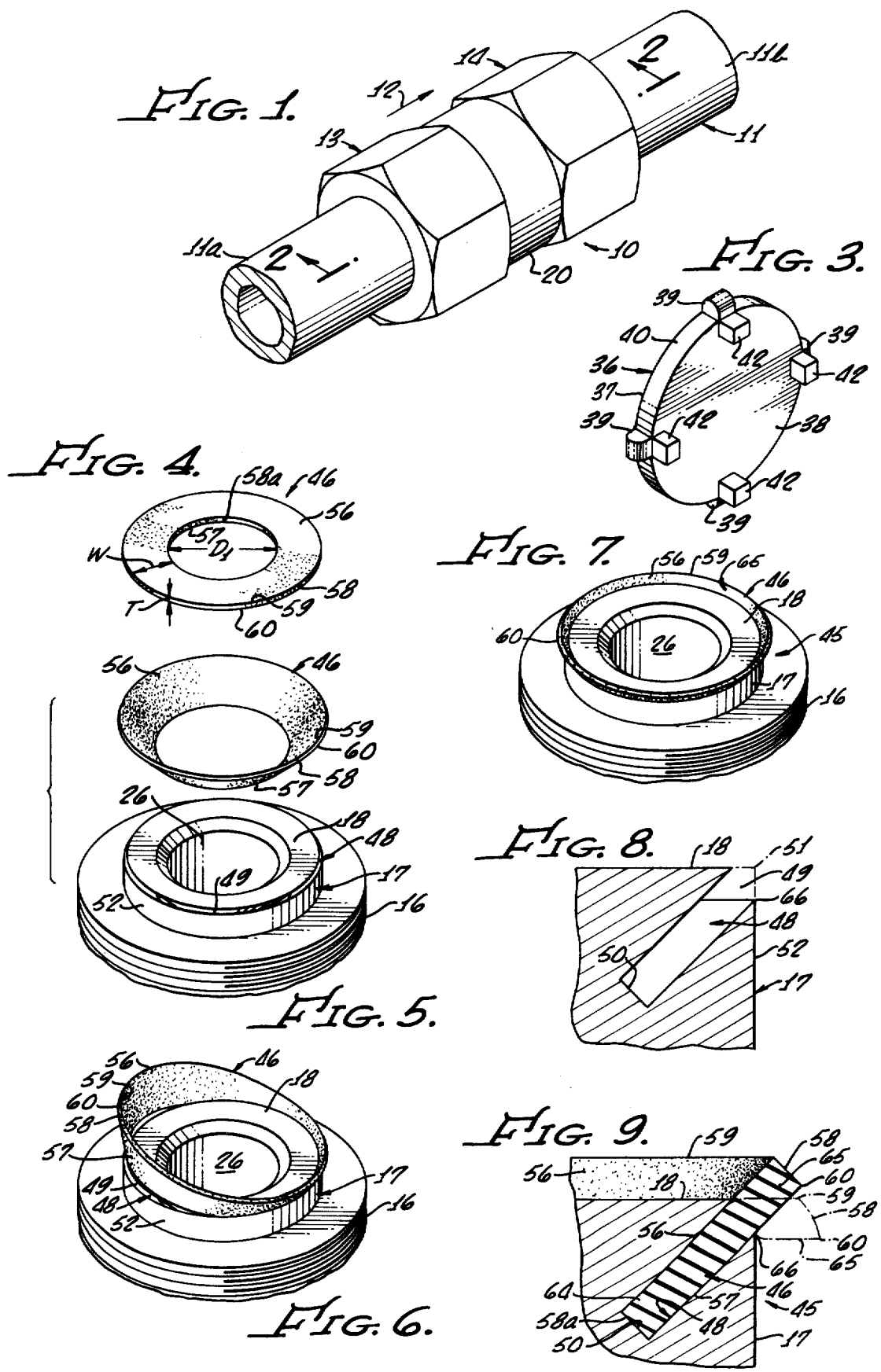

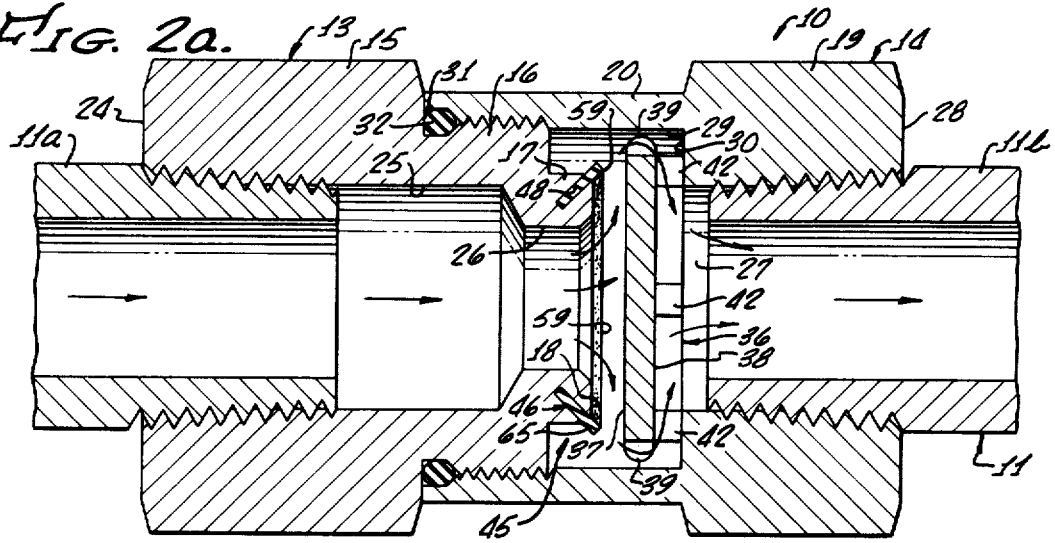

VALVE HAVING A BIAS-MOUNTED ELASTOMERIC SEALING ELEMENT, AND METHOD OF CONSTRUCTING THE SAME

FIELD OF THE INVENTION

The present invention relates generally to valves, and more particularly to a specially designed valve seat which utilizes an ordinary flat elastomeric washer to form a highly effective seal between the seat and the closure member of a valve at both low and high closure pressures.

DESCRIPTION OF PRIOR ART

The use of elastomeric members as sealing components of valve seats has heretofore led to various construction, performance, and maintenance problems, particularly where it is desired to preclude leakage across the seat at both high and low closure pressures.

An example of several of these problems is the cylindrical valve seat of a conventional inline disc check valve. The valve seat has an axially extending flow passage which opens outwardly through the forward end or seating surface of the valve seat. An annular groove which circumscribes the flow passage is formed in the end seating surface and receives an elastomeric O-ring seal. The cross-sectional diameter of the O-ring is greater than the depth of the annular groove. A portion of the O-ring thus projects forwardly of the seating surface. Upon a reverse flow pressure in the valve, its closure disc is driven against the exposed O-ring portion to effect a seal between the disc and O-ring and thereby prevent reverse flow through the valve seat.

However, because of its rounded forward portion, the O-ring is not particularly effective as a low back pressure sealing element. At relatively low back pressures, leaks frequently occur between the closure disc and the O-ring. Only when the back pressure is sufficient to compress the O-ring between the disc and the valve seat is a satisfactory seal formed. Repeated compression of the O-ring at moderate to high back pressures leads to fairly rapid wear of the O-ring, and thus the need to frequently replace it under many operating conditions.

Additionally, it has proven difficult to properly retain the O-ring seal within its groove. What often happens is that when forward flow is restored in the valve, a low pressure area is formed adjacent the O-ring which pulls it out of its groove. This, of course, requires that the valve be disassembled to reposition its O-ring seal.

Many attempts have been made to overcome these problems. For example, various elastomeric sealing elements have been designed, each of which has a sharp angular edge that contacts the disc (or other closure element) upon a low back pressure to form a "line" seal around the disc. However, to achieve this type of seal, it has heretofore been necessary to grind or cut, or otherwise specially shape the elastomeric element (for example, by molding it) to form such edge. Each of these techniques can add significantly to the production cost of the valve.

Additionally, many of these specially shaped sealing elements, like their O-ring counterpart, are prone to dislodgement under forward flow conditions unless special clamping mechanisms are added to the valve seat to retain the elastomeric seal thereon. Moreover, the forming or molding of a sealing edge often results in accelerated seal wear and/or a reduction in the valve seat's high pressure sealing performance.

Accordingly, it is an object of the present invention to provide a valve seat, and method of constructing the same, that eliminate or minimize above-mentioned and other problems.

SUMMARY OF THE INVENTION

In carrying out principles of the present invention in accordance with a preferred embodiment thereof, a valve seat is constructed by providing a body having a frustoconical annular groove formed therein, and a forwardly facing seating surface, and inserting in the groove a radially inner portion of an elastomeric sealing washer having a flat unstressed configuration and an outer circumferential edge. The outer circumferential edge of the installed washer projects forwardly of the body seating surface to provide a leading edge seal between the valve seat and the closure member of a valve at low closure pressures.

According to a feature of the invention, the annular groove is dimensioned relative to the washer so that the installed washer is in a radially stretched condition, with a radially inner portion thereof being slightly compressed by the groove, to thereby preclude leakage through the groove around the washer portion retained therein.

According to another aspect of the invention, the groove is positioned relative to the body seating surface so that upon the engagement of the seating surface by a valve closure member, the outwardly projecting radial portion of the washer is deflected rearwardly and outwardly relative to the seating surface without being compressed between the closure member and the seating surface.

The washer may be stamped from a sheet of elastomeric material, in which case one of the resulting outer peripheral corner edges of the stamped washer defines the leading edge of the valve seat.

BRIEF DESCRIPTION OF THE DRAWINGS

FIG. 1 is a perspective view of an inline disc check valve embodying principles of the present invention and installed between adjacent sections of a pipe;

FIG. 2a is a greatly enlarged cross-sectional view through the valve, taken along line 2—2 of FIG. 1, illustrating its valve seat and closure disc during forward fluid flow through the valve;

FIG. 2b is a view similar to that of FIG. 2a, showing the interaction between the valve seat and the disc during low back pressure in the valve;

FIG. 2c is a view similar to that of FIG. 2b, showing the interaction between the valve seat and disc during high back pressure in the valve;

FIG. 3 is a perspective view of the closure disc;

FIG. 4 is a perspective view of a stamped elastomeric washer used as the sealing element of the valve seat;

FIG. 5 is an exploded perspective view of the valve seat illustrating the washer in its radially stretched and axially skewed condition after installation in a frustoconical annular groove formed in the body portion of the valve seat;

FIG. 6 illustrates the washer being installed in the groove;

FIG. 7 is a view similar to FIG. 6, showing the valve seat with its washer completely installed in the annular groove;

FIG. 8 is a greatly enlarged, fragmentary cross-sectional view taken through the seat body and its annular groove; and FIG. 9 is a view similar to FIG. 8 with the washer installed in the groove.

DETAILED DESCRIPTION

Referring to FIG. 1, principles of the present invention are embodied in an inline check valve 10 connected at its opposite ends to inlet and outlet sections 11a, 11b of a pipe 11. The installed valve permits fluid flow through the pipe in a "forward" direction indicated by the arrow 12, but precludes fluid flow in an opposite or "reverse" direction through the pipe. As will be seen, the valve 10 has a specially designed valve seat which incorporates a uniquely positioned elastomeric sealing element that gives the valve seat excellent sealing characteristics at even very low back pressures, yet is quite inexpensive to produce, unusually long wearing, and extremely reliable. Although the described check valve 20 is of the movable disc type, it will be apparent that principles of the invention are adapted for use in other types of valves (particularly in other types of check valves) as well.

As illustrated in FIG. 2a, the valve 10 has an elongated, generally cylindrical two piece body or housing formed of a suitable material, such as metal or plastic, and comprising an inlet section 13 and an outlet section 14 threadedly connected to the inlet section. The inlet section 13 has an outer end portion 15 having a hexagonally shaped cross-section, a transversely reduced, externally threaded circular cylindrical intermediate portion 16, and a circular cylindrical inner end portion 17. The end portion 17 has a substantially planar downstream or forward end surface 18 and an outer diameter smaller than that of the intermediate portion 16. The outlet section 14 has an outer end portion 19 having a hexagonally shaped cross-section substantially identical to that of the opposite body end portion 15, and a transversely reduced inner end portion 20 having a circular cross-section.

Extending axially inwardly through the outer end surface 24 of the inlet section 13 is an internally threaded bore 25 which threadedly receives the pipe section 11a. Bore 25 communicates with a smaller diameter bore 26 extending axially inwardly through the inner end portion 17, and forms with the bore 26 a flow passage through the inlet section 13.

At the downstream end of the valve body (i.e., its right end in FIG. 2a), an internally threaded bore 27 extends axially inwardly through the outer end surface 28 of the body portion 19 and threadedly receives the pipe section 11b. The bore 27 has a diameter substantially identical to that of the bore 25 and communicates at its inner end with a larger diameter bore 29 which extends axially through the entire length of the cylindrical body portion 20. The juncture of the bores 27, 29 defines an interior annular shoulder 30 within the valve which is spaced longitudinally apart, in a forward or downstream direction, from the forwardly facing end surface 18. The bores 25, 26, 29 and 27 define a continuous, longitudinally extending flow passage through the valve 10, the bore 29 defining a transversely enlarged portion of such flow passage which circumscribes the inner end portion 17 of the body inlet section 13.

A left end portion (as viewed in FIG. 2a) of the bore 29 is internally threaded and threadedly receives the externally threaded intermediate portion 16 of the inlet section 13. Complementary exterior and interior annular recesses are respectively formed in the valve body portions 16, 20 to define an annular interior chamber 31 in the assembled valve 10 adjacent the juncture of the portions 15, 16 of the body inlet section 13. Received and slightly radially compressed within the chamber 31 is an elastomeric O-ring seal 32 for sealing against valve leakage at the juncture of the inlet and outlet sections 13, 14.

A valve shutoff or closure member in the form of a molded plastic disc 36 having a flat upstream end surface 37 and a downstream end surface 38 is mounted in the bore 29 for axial movement between a first position indicated in FIG. 2a and a second position indicated in FIG. 2c. The disc 36 has a diameter smaller than the diameter of bore 29 but larger than the diameter of bore 27 or the outer diameter of the inner end portion 17 of the body inlet section 13.

Molded integrally with the disc 36 are four tabs 39 (FIG. 3) which project radially outwardly from the peripheral edge surface 40 of the disc and are spaced equally around its circumference. The tabs 39 function to keep the disc 36 generally axially centered within the bore 29. Also molded integrally with the disc 36 are four additional tabs 42 which project axially outwardly from the downstream disc surface 38. Each of the axially projecting tabs 42 is positioned adjacent the peripheral disc surface 40 and one of the radially projecting tabs 39.

As illustrated in FIG. 2a, with the disc 36 in its first position, the axially projecting tabs 42 engage the interior shoulder 30 and limit downstream movement of the disc to a position rearwardly of the shoulder 30.

A forward flow of fluid through the flow passage of the valve 10, as indicated by the arrows in FIG. 2a, forces the disc 36 to its first position wherein the tabs 42 engage the internal shoulder 30 and the disc is positioned forwardly of the end surface 18. Fluid flowing through the bore 26 into the larger bore 29 flows around the perimeter of the disc 36 (between each pair of the tabs 39 and each pair of the tabs 42) and then into the bore 27, also as indicated by the arrows in FIG. 2a.

Reverse flow of fluid through the valve 10 (i.e., flow from right to left in FIGS. 2a through 2c) is precluded by the cooperation between the shutoff disc 36 and a specially designed valve seat 45 which includes the inner portion 17 of the valve body inlet section 13, and a uniquely mounted elastomeric sealing ring 46.

In constructing the specially designed valve seat 45, the forward end portion 17 of the body inlet section 13 is used as the body of the valve seat, and the forward end surface 18 is used as a seating surface thereof.

To mount the elastomeric ring 46 on the seat body 17 in a manner providing the significant operational advantages described below, a frustoconical annular groove 48 (FIG. 8) is formed in and completely circumscribes the seat body 17. The groove 48, which has an entrance opening 49, an inner end 50, and an elongated, generally rectangular cross-section, extends inwardly through the juncture 51 of the seating surface 18 and the rearwardly extending outer lateral surface 52 of the cylindrical seat body 17. From its generally forwardly facing entrance opening 49, which laterally circumscribes the body 17, the groove 48 slopes rearwardly and inwardly.

It is important to note that the annular elastomeric ring 46, illustrated in FIG. 4 in an unstressed state, has a conventional flat washer-shaped configuration. The washer 46, in fact, is simply stamped from a flat sheet of elastomeric material such as rubber or neoprene (although it could be molded in such flat configuration or purchased in a standard size, if desired). However, despite its ordinary shape, the stamped washer is used to form a leading sealing edge of the valve seat 45. This unusual result, it will be seen, is accomplished without the need for the expensive edge-forming molding or shaping techniques associated with conventional edge-sealing elastomeric elements.

The washer 46 (FIG. 4) has an elongated rectangular cross-section, a pair of parallel opposite end surfaces 56, 57, and an outer peripheral side surface 58 extending perpendicularly between the end surfaces 56, 57 and defining therewith a pair of axially opposite outer peripheral corner edges 59, 60. For reasons described below, the washer 46 has an inner diameter $D_1$ slightly smaller than the minimum diameter $D_2$ (FIG. 2b) of the axially biased annular groove 48, a cross-sectional width W greater than the depth of the groove 48, and a thickness T slightly less than or equal to the width of the groove 48.

Referring to FIGS. 4 through 7, the sealing washer 46 (FIG. 4) is mounted on the seat body 17 by first radially stretching and axially skewing the washer to a frustoconical shape indicated in FIG. 5, and then inserting a radially inner portion of the washer (i.e., a circumferential portion of the washer which extends outwardly from its inner peripheral surface 58a) into the groove 48. This is most easily accomplished by first inserting only a circumferential portion of such radially inner portion into the groove 48, as shown in FIG. 6, and then stretching the washer while working the remainder of the radially inner portion into the groove around the perimeter of the seat body 17 in a manner analogous to installing an automobile tire on its wheel.

As shown in FIGS. 7 and 9, with the radially inner portion 56 (FIG. 9) of the washer 46 inserted and retained within the groove 48, a radially outer portion 65 of the washer projects forwardly and radially outwardly of the seating surface 18. The circumferential corner edge 59 of the installed washer forms a circular leading edge of the valve seat 45 and circumscribes the seating surface 18. The leading edge 59 has a diameter slightly less than the diameter of the closure disc 36 (FIG. 2a).

During normal flow conditions illustrated in FIG. 2a, the disc is positioned forwardly of the leading washer edge 59. Upon an initial low pressure reverse flow through the pipe 11 (FIG. 2b) the disc 36 is forced rearwardly within the bore 29 until it contacts the leading washer edge. This forms an edge or "line" seal between the leading edge 59 and the upstream surface 37 of the disc 36, thus preventing fluid in the bore 29 from entering the bore 26.

As previously mentioned, this effective edge seal between the valve seat and the closure disc is obtained without the necessity for grinding or cutting the sealing washer, or for specially molding it to obtain a complex cross-section, to form this sealing edge. Importantly, the groove 48 not only retains the washer on the seat body, but deforms it to a frustoconical shape wherein the existing peripheral corner edge 59, which is a natural result of the ordinary stamping process, forms such sealing edge.

An increase in back pressure (FIG. 2c) drives the disc 36 rearwardly into engagement with the seating surface 18 of the seat body 17. This deflects the radially outer portion 65 of the washer 46 rearwardly and radially outwardly relative to the seating surface 18 (see FIG. 9) and permits direct contact of the disc with the seating surface without interposition of any part of the washer. Because the annular groove 48 extends inwardly through the outer side and front surface juncture 51 of the seat body 17 (FIG. 8), and because an outer edge 66 of the groove is spaced rearwardly (upstream) of the seating surface 18, at no time is the sealing washer 46 compressed between the disc 36 and the seating surface 18, unlike conventional elastomeric sealing elements. Despite this fact, the radially outer washer portion 65 is maintained in sealing engagement with the disc 36 by fluid pressure within the bore 29 which, in addition to the resilient force in the washer (i.e., the internal force tending to return the washer to its non-deflected position), maintains a contact force between the disc 36 and the rearwardly deflected washer portion. Because the washer 36 is not compressed between the disc 36 and the seating surface 18 the washer has proven to be unusually long wearing.

Another advantage is obtained by using the ordinary flat washer 46 as an edge-sealing element of the valve seat 45. When the leading washer edge 59 begins to wear, the washer can be removed from its retaining groove, flipped over, and then reinserted in the groove so that its other peripheral corner edge 60 becomes the leading edge of the valve seat. This doubles the life of the already long-lived and inexpensive sealing element by taking advantage of both existing outer corner edges of the washer.

As previously noted, the inner diameter $D_1$ (FIG. 4) of the washer is slightly smaller than the minimum diameter $D_2$ (FIG. 2b) of the annular groove 48. Because of this, the installed washer is in a radially stretched condition. This causes a contact force between the inner end surface 50 (FIG. 9) of the groove 48 and the inner peripheral side surface 58a of the washer.

Additionally, the radially inner portion 56 of the washer is slightly laterally compressed. These two factors preclude leakage of fluid from the bore 29 around the radially inner washer portion into the bore 27 under low pressure back flow conditions. Under high back pressure (FIG. 2c) the disc 36, when it rearwardly deflects the radially outer washer portion 65, slightly pinches the washer against an annular outer edge 66 of the groove 48 as indicated in FIG. 9. This further aids in precluding fluid from entering the groove and flowing around the radially inner washer portion retained therein.

The described method of mounting the flat sealing washer prevents it from being dislodged during forward flow conditions in the valve. The annular groove not only positions the washer so that one of its outer peripheral corner edges becomes a sealing edge of the valve seat, but firmly grips the washer as well. This, too, is accomplished without the necessity of clamping mechanisms or other complex mounting or forming techniques. Additionally, it can be seen in FIGS. 2a through 2c that only the small annular portion of the washer protruding outwardly of the groove is exposed to dislodgement forces of fluid flowing forwardly through the valve. Because of these factors, the need to periodically disassemble the valve to reposition its sealing element is eliminated.

The foregoing detailed description is to be clearly understood as given by way of illustration and example only, the spirit and scope of this invention being limited solely by the appended claims.

I claim:

1. A valve comprising:
   (a) a body having a forwardly facing seating surface and a frustoconical annular groove formed in said body;
   (b) an elastomeric annular sealing washer, said washer having a radially inner portion retained in said groove, and having an outer circumferential edge disposed forwardly of said seating surface;
   (c) a valve closure having a surface extending across said seat and radially outwardly thereof, said valve closure being mounted for movement between an open position displaced from said washer and a closed position in which the closure has a line contact with said washer edge and extends radially outwardly of said edge;
   (d) said washer being flat in unstressed condition and the radially inner portion of said washer being held in a stretched frustoconical configuration by said groove.

2. A valve comprising:
   (a) a body having a forwardly facing seating surface and a frustoconical annular groove formed in said body;
   (b) an elastomeric annular sealing washer, said washer having a radially inner portion retained in said groove, and having an outer circumferential edge disposed forwardly of said seating surface;
   (c) a valve closure having a surface extending across said seat and radially outwardly thereof, said valve closure being mounted for movement between an open position displaced from said washer and a closed position in which the closure has a line contact with said washer edge and extends radially outwardly of said edge;
   (d) said washer having an elongated rectangular cross-section and said outer circumferential edge comprising an outer peripheral corner edge of said washer, said washer having its outermost peripheral portion projecting forwardly and outwardly of said body seating surface and being free of contact therewith.

3. The valve of claim 2 wherein said washer comprises a stamped portion of a flat sheet of elastomeric material.

4. A check valve comprising:
   (a) a housing having a flow passage extending therethrough;
   (b) a valve seat carried by said housing and including:
      (1) a body having a seating surface positioned in said flow passage, and an opening extending through said seating surface and defining a portion of said flow passage,
      (2) an elastomeric sealing washer having an outer circumferential edge, and
      (3) means for mounting said washer on said body so that said outer circumferential edge of said washer circumscribes said seating surface and defines a forward sealing edge of said valve seat, said washer having a forwardly and radially outwardly projecting portion free of contact with said body and capable of being deflected rearwardly;
   (c) closure means mounted in said flow passage for rearward movement into sealing engagement with said forward edge of said valve seat in response to an initial reverse fluid flow through said flow passage to thereby preclude reverse fluid flow through said opening in said body of said valve seat, said closure means being mounted for further rearward movement into sealing contact with the seating surface by rearwardly deflecting said outwardly projecting portion;
   (d) said mounting means comprising a frustoconical annular groove formed in said body and receiving a radially inner portion of said washer;
   (e) said body having an outer lateral surface extending rearwardly from said seating surface, and said groove having an entrance opening laterally circumscribing said body, at least a portion of said entrance opening being positioned rearwardly of said seating surface, whereby upon a further reverse fluid flow in said flow passage, said closure means is forced rearwardly into engagement with said seating surface, said closure means thereby rearwardly deflecting a radially outer portion of said washer without compressing the same between said closure means and said seating surface;
   (f) said groove extending through the juncture of said seating surface and said outer lateral surface of said body.

5. An inline check valve comprising:
   (a) a generally cylindrical body having a pair of opposite ends, an axially extending flow passage opening outwardly through said opposite ends and having a transversely enlarged intermediate portion, and an inner cylindrical portion, said inner cylindrical portion being coaxial with said flow passage and having an end portion circumscribed by said intermediate flow passage portion and having a forward end surface, an axially extending opening defining a portion of said flow passage, and a frustoconical annular groove having a width, a depth, and a minimum diameter, said groove extending inwardly through the juncture of said forward end surface of said end portion;
   (b) an elastomeric annular washer having a radially inner portion retained in said groove, and an outer circumferential edge projecting in unsupported relation radially outwardly and forwardly of and circumscribing said forward end surface of said inner cylindrical portion of said body;
   (c) a closure disc mounted in said intermediate flow passage portion for rearward axial movement into a first closure position in sealing engagement with said outer circumferential edge of said washer in response to an initial reverse fluid flow through said flow passage, and into a second closure position, rearwardly of said first closure position, in sealing engagement with said forward end surface of said body, said outer circumferential edge being deflected rearwardly by said disc in said second closure position;
   (d) said washer being a stamped washer having a pair of outer peripheral corner edges, a thickness not greater than said width of said groove, a cross-sectional width greater than said depth of said groove, and an inner diameter less than said minimum diameter of said groove, and said outer circumferential edge of said washer comprising one of said pair of outer peripheral corner edges thereof.

6. The method of forming a circular leading sealing edge on a valve seat body having a forwardly facing seating surface, said method comprises the steps of:

(a) forming in the seat body a frustoconical annular groove having a generally forwardly facing opening;
(b) providing a flat elastomeric washer having an outer circumferential edge, an inner diameter less than the minimum diameter of said opening of said groove and an outer diameter greater than the maximum diameter of said seating surface;
(c) radially stretching and axially skewing said washer; and
(d) inserting a radially inner portion of said washer in said groove so that said outer circumferential washer edge projects forwardly and radially outwardly of the seating surface and forms a free and unsupported leading sealing edge of the seat body.

7. The method of claim 6 wherein said providing step (b) is performed by stamping said washer from a sheet of elastomeric material.

8. The method of constructing a valve seat comprising the steps of:
    (a) forming a body having a forwardly facing end surface, a lateral surface extending rearwardly from the perimeter of said end surface, and a flow passage extending rearwardly through said end surface;
    (b) forming in said body a frustoconical annular groove having a generally forwardly facing entrance opening having a minimum diameter and being positioned adjacent the juncture of said end and lateral surfaces of said body, said groove further having a depth, a width, a minimum diameter, and an inner end surface;
    (c) forming a flat elastomeric washer having an outer circumferential edge, and inner peripheral surface, an inner diameter less than said minimum diameter of said entrance opening of said annular groove and an outer diameter greater than the maximum diameter of said end surface;
    (d) radially stretching and axially skewing said washer to a frustoconical shape; and
    (e) inserting a radially inner portion of said washer in said groove so that a radially outer portion of said washer circumscribes and projects forwardly, radially outwardly of, and free of contact with said end surface of said body.

9. The method of claim 8 wherein said washer forming step (c) is performed by stamping said washer from a sheet of elastomeric material.

10. The method of claim 8 wherein said washer-forming step (c) includes forming said washer with a thickness not greater than said width of said groove.

11. The method of claim 8 wherein said washer-forming step (c) includes forming said washer with an inner diameter less than said minimum diameter of said groove, and wherein said inserting step (e) includes bringing the inner peripheral surface of said washer into sealing engagement with said inner end surface of said groove.

12. The method of constructing a valve seat comprising the steps of:
    (a) providing a cylindrical body having a forward end surface, an outer lateral surface extending rearwardly from the perimeter of said end surface and defining with said end surface a front corner edge of said body, and an axially extending flow passage opening outwardly through said end surface;
    (b) forming through said front corner edge a frustoconical annular groove in said body;
    (c) providing a sheet of elastomeric material having a thickness not greater than the width of said groove;
    (d) stamping a sealing washer from said sheet of elastomeric material, said washer having a cross-sectional width greater than the depth of said groove, an inner diameter less than the minimum diameter of said groove and an outer diameter greater than the maximum diameter of said forward end surface;
    (e) radially stretching and axially skewing said washer to a frustoconical shape; and
    (f) inserting a radially inner portion of said washer into said annular groove so that a radially outer portion of said washer projects freely forwardly and outwardly beyond said forward end surface.

* * * * *